E. L. BURTON.
DRILL BIT.
APPLICATION FILED JULY 29, 1916.

1,211,537.

Patented Jan. 9, 1917.

Inventor
E. L. Burton
By Watson E. Coleman
Attorney

UNITED STATES PATENT OFFICE.

ELISHA L. BURTON, OF THEALKA, KENTUCKY, ASSIGNOR OF ONE-HALF TO ROSCOE C. BURTON, OF THEALKA, KENTUCKY.

DRILL-BIT.

1,211,537.   Specification of Letters Patent.   Patented Jan. 9, 1917.

Application filed July 29, 1916. Serial No. 112,049.

*To all whom it may concern:*

Be it known that I, ELISHA L. BURTON, a citizen of the United States, residing at Thealka, in the county of Johnson and State of Kentucky, have invented certain new and useful Improvements in Drill-Bits, of which the following is a specification, reference being had to the accompanying drawings.

This invention relates to drill bits and particularly to bits for drilling coal, slate or like material.

Generally speaking my invention has for its objects the production of a bit which requires less labor or power to operate it than the ordinary bit, that is more durable and that is so constructed that it may be easily filed, sharpened or split by the operator.

A further object is to provide a bit with cutting teeth and form the spiral shank of the bit with longitudinally extending creases or grooves which terminate between the teeth at the base thereof to thereby guide the file when the drill is being sharpened.

Still another object is to provide a drill the end of which is formed with teeth disposed on each side of the axial center of the drill, these teeth being inclined in opposite directions and further to provide a drill, the end of which is longitudinally split to provide two cutting sections divergently disposed and extended spirally in opposite directions, each section being filed to provide two teeth having cutting edges.

Other objects will appear in the course of the following description.

Figure 1:
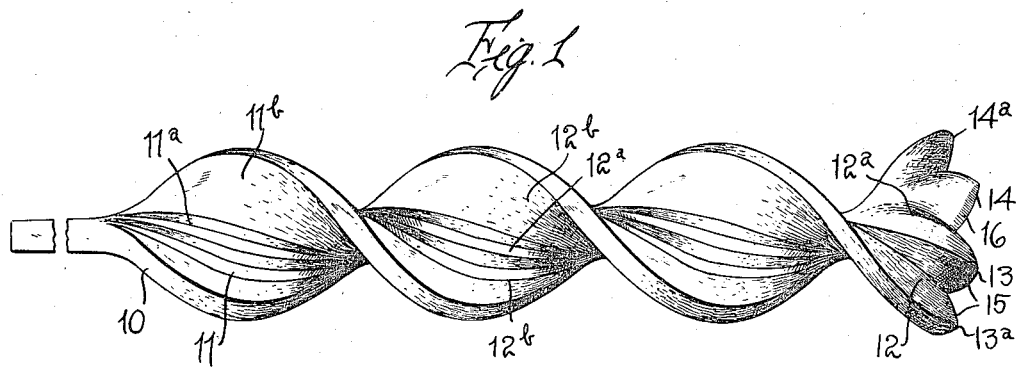
Figure 2:
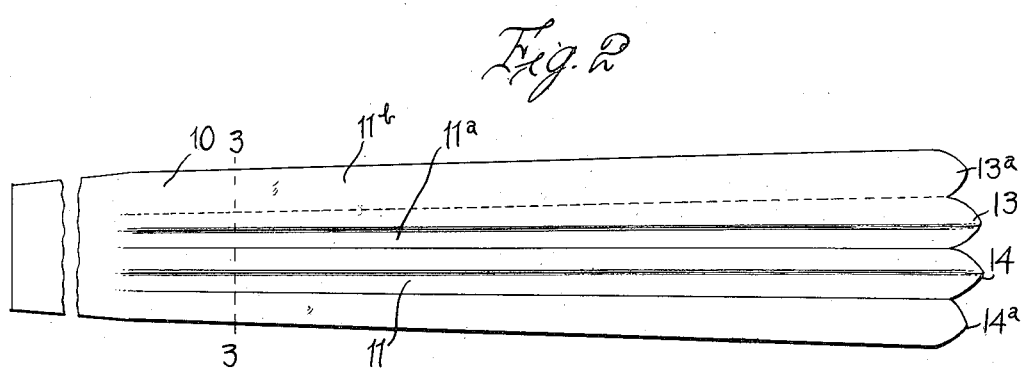
Figure 3:
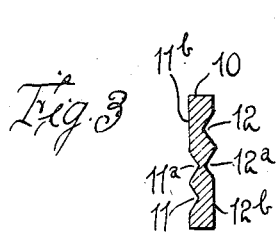
Figure 4:
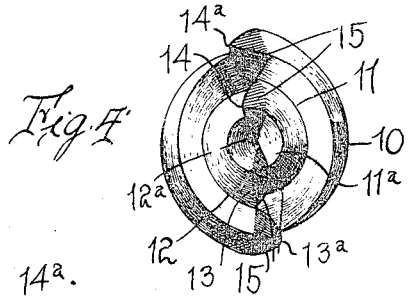
Figure 5:
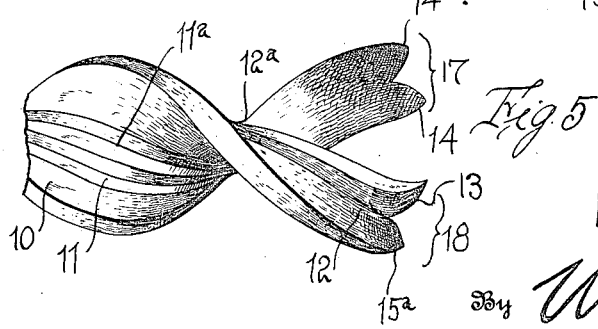

My invention is illustrated in the accompanying drawings, wherein:

Figure 1 is a side elevation of one form of bit constructed in accordance with my invention; Fig. 2 is an elevation of the bar from which the bit is twisted; Fig. 3 is a section on the line 3—3 of Fig. 2; Fig. 4 is an end view of the bit; and Fig. 5 is a fragmentary side elevation of a slightly modified form of bit.

Referring to these figures, it will be seen that I have illustrated two forms of bit. Both of these forms are alike except one feature. The form illustrated in Fig. 1 primarily consists of a shank of flat metal which is twisted upon itself to form a spiral shank, at one end being adapted to be engaged with means for rotating the shank and at the other end being provided with cutting teeth. In Fig. 2 I have illustrated the shank 10 previous to being twisted. This shank 10 is formed from a point more or less adjacent one end to its opposite end with a pair of grooves, crimps or creases 11 and 11$^a$ extending longitudinally of the shank and a pair of creases or grooves 12 and 12$^a$ on the opposite face of the shank. It will be seen that the crease 11 is relatively close to one edge of the shank and the crease 12 relatively close to the opposite edge of the shank. It will be seen that the creases 11$^a$ and 12$^a$ are disposed directly opposite each other. It will likewise be seen that on one face of the shank there is a relatively flat portion 11$^b$ and on the opposite face of the shank there is a relatively flat portion 12$^b$, the flat portion 11$^b$ being disposed opposite the crease or groove 12 while the flat portion 12$^b$ is disposed opposite the crease 11. At its cutting end the shank is formed with four teeth, two of them being designated 13 and 13$^a$ and two 14 and 14$^a$. The shank is twisted spirally nearly its entire length. This spiral twist of the shank may be given either before the creases 11, 11$^a$, 12 and 12$^a$ are formed in the shank or afterward and either before or after the teeth 13 and 14 have been formed.

It will be noted that the creases 11$^a$ and 12$^a$ extend along the middle of the shank for the entire length of the shank and terminate at the conjoined bases of the teeth 13 and 14 and that the crease 11 extends longitudinally along the shank and terminates at the intersection of the bases of the teeth 14 and 14$^a$ while the groove 12 also extends longitudinally along the shank and terminates at the bases of the teeth 13 and 13$^a$. The teeth 13 and 13$^a$ are beveled on one face as at 15 while the teeth 14 and 14$^a$ are beveled upon the opposite face. The teeth 13 and 14 have their inner edges beveled upon opposite faces as at 16. It will be seen that these teeth 14 and 14$^a$ are disposed to the plane of the spiral as are the teeth 13 and 13$^a$ and that the teeth 14 and 14$^a$ extend in opposite directions to the teeth 13 and 13$^a$.

The groove or crease 11 forms a guide for the file used in sharpening the teeth 14 and 14$^a$ while the groove or crease 12 forms the guide for the file in sharpening the teeth 13 and 13ª. The two grooves 11ª and 12ª form a guide for the file in sharpening the adjacent faces of the teeth 13 and 14.

In Fig. 5 I show a slightly modified form of this bit in which all of the parts are precisely as previously described and therefore are given the same numerals but in which the shank is longitudinally split for a distance from the intersection of the bases of the teeth 13 and 14 inward to any desired extent. These two sections 17 and 18 formed by splitting the shank are then diverged with relation to each other as shown clearly in Fig. 5. The creases 11ª and 12ª in this case form guides for cutting inward through the shank.

A drill constructed in accordance with my invention may be so made as to have a clearance of one-sixteenth of an inch to the foot, thus if the drill is six feet long it will be tapered from the cutting end back to the other end of the shank so as to keep the drill from engaging the wall of the bore or choking with the substance which is being drilled.

It will be understood of course, that these drills are to be made in different sizes. Ordinarily there are three different sizes of drills. The first is two feet, the next is four feet and the next is six feet and each drill is adapted to bore two feet, then it is changed for the next longest drill until the six foot hole is finished. The first drill is larger than the second, the second drill larger than the third so as to get a clearance. This is provided for in my construction by increasing the diameter of the drill toward the butt end thereof. The form of drill shown in Fig. 5 is preferable for use in some kinds of coal and the form of drill shown in Fig. 1 can be readily transformed into that shown in Fig. 5 by simply splitting the end of the drill as illustrated. This drill is very easy to operate and is very durable. It is not necessary that the operator bring it to the shop in order that it may be split or sharpened and the teeth or points of the drill may be readily sharpened by the operator himself inasmuch as his file is guided by the creases in the shank.

It will be noted that the end of the drill is provided with teeth and that these teeth are sharp-pointed and have cutting edges. The shape of these teeth makes them take hold easily and makes it faster and easier to drill than with the ordinary bit. Inasmuch as the drill is initially tapered, the miner or operator can sharpen or drill without the aid of a blacksmith.

My drills are adapted for use with the ordinary ratchet rock drills or with the "post" drilling machines. It is, of course, to be understood that the creases, grooves or crimps which extend longitudinally of the shank may be made in any suitable manner and that I do not wish to be limited to a drill shank having grooves properly so called, formed in the faces thereof.

Having described my invention, what I claim is:

1. A drill having a screw shaped shank and having a plurality of pairs of teeth at its cutting extremity, the teeth on one side of the axis being bent in one direction and the teeth on the other side in the opposite direction, the shank being formed on opposite sides with grooves intersecting the bases of said teeth and forming guides in filing the teeth.

2. A drill having a screw shaped shank and having two pairs of teeth at its cutting extremity, one pair of teeth being oppositely bent to the other pair, the shank being formed on one side with a crease extending longitudinally of the shank and intersecting the cutting end of the shank between the teeth of one pair, the opposite face of the shank having a like crease intersecting the end of the shank between the teeth of the other pair, and the shank being formed with opposite creases intersecting the cutting extremity of the shank between the two pairs of teeth.

3. A drill having a screw shaped shank and having a plurality of pairs of teeth at its cutting extremity, the teeth on one side of the axis being bent in one direction and the teeth on the other side in the opposite direction, the shank being formed with grooves intersecting the bases of said teeth and forming guides in filing the teeth.

In testimony whereof I hereunto affix my signature in the presence of two witnesses.

ELISHA L. BURTON.

Witnesses:
HARRY C. HOWES,
R. C. BURTON.